M. SCHARFBERG.
Anti-Friction Eccentric.
No. 210,969. Patented Dec. 17, 1878.
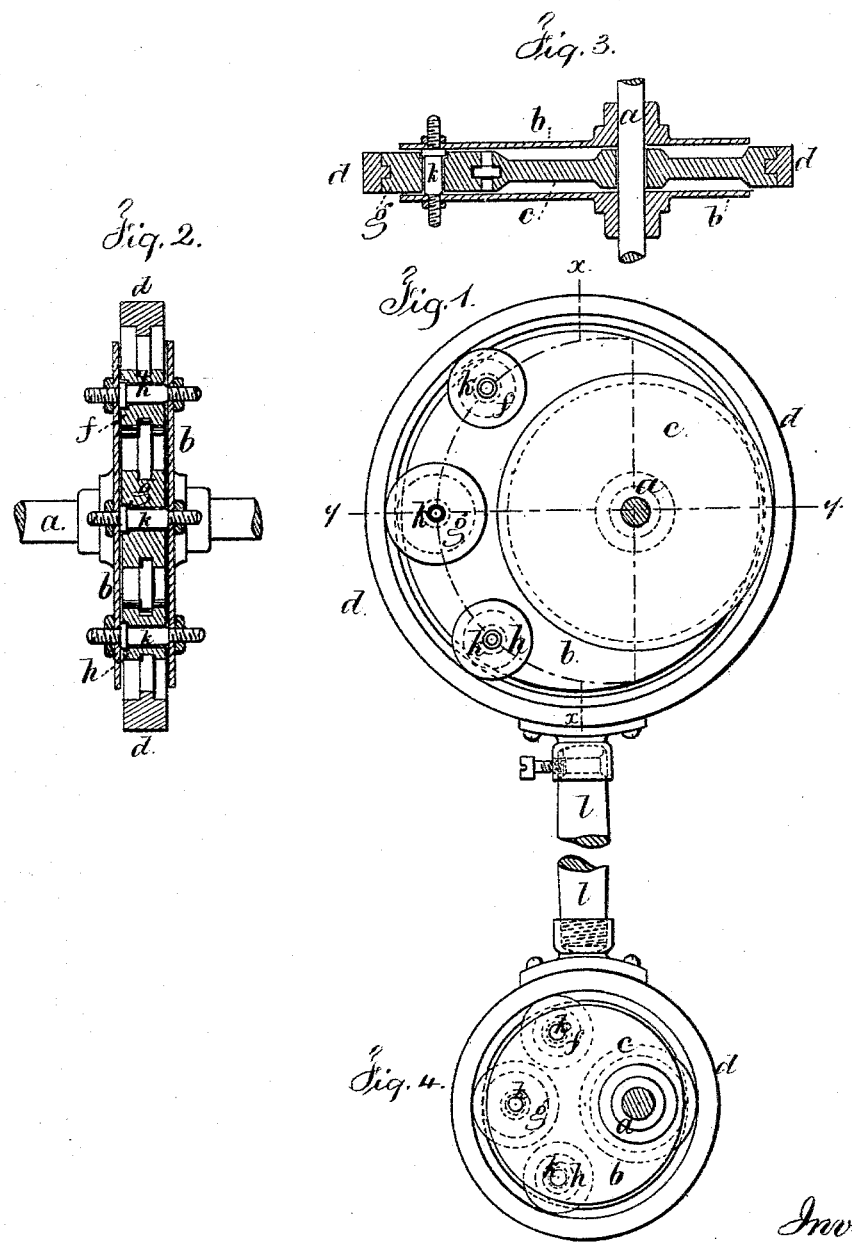

UNITED STATES PATENT OFFICE.

MENDEL SCHARFBERG, OF VIENNA, AUSTRIA, ASSIGNOR OF ONE-THIRD HIS RIGHT TO MARCUS LOWENDAHL, OF SAME PLACE, AND MAX GUTMANN, OF DRESDEN, SAXONY.

IMPROVEMENT IN ANTI-FRICTION ECCENTRICS.

Specification forming part of Letters Patent No. 210,969, dated December 17, 1878; application filed October 3, 1878.

*To all whom it may concern:*

Be it known that I, MENDEL SCHARFBERG, of Vienna, in the Empire of Austria, have invented an Improvement in Anti-Friction Eccentrics, of which the following is a specification:

The object of this invention is to remove as much as possible the friction of eccentrics. This is accomplished by providing rollers or wheels within the eccentric-ring, so that the surfaces in contact with the eccentric-ring will roll thereon instead of sliding.

In the drawing, Figure 1 is a side view of the eccentric, with one of the side plates removed. Fig. 2 is a section at the line $x\,x\,x$. Fig. 3 is a section at the line $y\,y$; and Fig. 4 is an elevation of an eccentric of a different size, but of the same throw as Fig. 1.

Upon the shaft $a$ the two side plates or disks, $b\,b$, are permanently attached. Between these side plates, and loose upon the shaft $a$, is a roller or wheel, $c$. There are also two or more rollers between the side plates, $b\,b$. I have shown three such rollers, $f\,g\,h$, upon arbors or shafts $k$, that pass through the side plates, and are provided with shoulders to take against the surfaces of the side plates, and nuts to secure the arbors in place.

The positions of these wheels or rollers are such that their surfaces are in contact with the interior of the circular eccentric-ring $d$; and there are grooves in the peripheries of the rollers and a rib around the interior of the eccentric-ring, (or these may be transposed in position,) the object of these grooves and rib being to retain the eccentric-ring in position laterally, and prevent a rubbing friction of the eccentric-ring against the side plates, $b$. The ribs and grooves may be V-shaped. I, however, have shown them as square.

The rod $l$, passing away from the eccentric-ring, may be connected to any mechanism that requires to be moved. In cases where power is applied to the rod $l$, the shaft $a$ may be revolved by the action of the eccentric-ring, in a manner similar to a crank. For this purpose it is preferable to proportion the rollers as represented in Fig. 4.

I am aware that anti-friction wheels or rollers have been introduced between a hub or shaft and a wheel or pulley that surrounds such anti-friction rollers, and in some cases the pulley has been eccentric, as shown in Patent No. 44,409.

I claim as my invention—

1. The combination, with the eccentric-ring $d$, of the internal wheels or rollers, the arbors or shafts of such rollers, and the side plates, $b\,b$, substantially as set forth.

2. The eccentric-ring $f$ and internal rollers or wheels, the surfaces in contact being provided with ribs and grooves, in combination with the shaft $a$ and the side plates, $b$, that support the arbors or shafts $k$, substantially as set forth.

This specification signed by me this 12th day of August, 1878.

MENDEL SCHARFBERG.

Witnesses:
WILHELM WIESENHÜTTER,
MARTIN KÖRNER.